United States Patent [19]
Mendelson et al.

[11] Patent Number: 5,561,791
[45] Date of Patent: Oct. 1, 1996

[54] METHOD AND APPARATUS FOR CONDITIONING TIMED PROGRAM INDEPENDENT OF TRANSPORT TIMING

[75] Inventors: Jeffrey B. Mendelson, Shrewsbury; Matthew S. Goldman, Marlborough; David E. Morris, Lexington, all of Mass.

[73] Assignee: Digital Equipment Corporation, Maynard, Mass.

[21] Appl. No.: 419,201

[22] Filed: Apr. 10, 1995

[51] Int. Cl.⁶ .............................. H04J 3/24; G06F 15/163
[52] U.S. Cl. .................... 395/550; 395/200.13; 370/94.1
[58] Field of Search .............................. 395/550, 200.13, 395/200.18, 849, 853, 854, 855; 370/94.1, 94.2

[56] References Cited

U.S. PATENT DOCUMENTS

| | | | |
|---|---|---|---|
| 5,384,774 | 1/1995 | Martin et al. | 370/82 |
| 5,392,280 | 2/1995 | Zheng | 370/94.1 X |
| 5,392,286 | 2/1995 | Tanaka et al. | 370/94.1 |
| 5,414,696 | 5/1995 | Tsuzuki et al. | 370/94.1 X |
| 5,467,344 | 11/1995 | Solomon et al. | 370/94.2 X |

*Primary Examiner*—Thomas M. Heckler
*Attorney, Agent, or Firm*—Dirk Brinkman; Ronald C. Hudgens; Arthur W. Fisher

[57] ABSTRACT

In an interactive video-on-demand system, real-time programs are encoded as a transport stream including a plurality of transport stream packets. Some of the transport stream packets include timing signals indicating the real time of the program. The transport stream packets are formatted into transport cells for transport over an asynchronous transfer mode network from a source to a destination. The cells are transported at a transport rate which is determined by a network clock. The transport rate is chosen to deliver the transport stream faster than the real time of the program. While transporting the transport stream, it is determined if the transport stream is being transported ahead of the real time of the program. In this case, idle cells are injected into the transport stream to have the program arrive at the destination in the real time of the program.

3 Claims, 8 Drawing Sheets

METHOD AND APPARATUS FOR CONDITIONING TIMED PROGRAM INDEPENDENT OF TRANSPORT TIMING

FIELD OF THE INVENTION

This invention relates generally to data communications, and more particularly to communicating timed program signals using synchronous communications networks.

BACKGROUND OF THE INVENTION

In a video-on-demand system, "programs", such as games, movies, sporting events, concerts, etc., are typically supplied as analog signals. The analog signals can be recorded on magnetic or optical media, for example VHS tapes, for distribution. A "video server" can be used to transport the program signals on-demand to customer premises. The communication media used to transport the program signals can be public, as well as private.

To reduce the bandwidth required to transport the program signals over the communications, the analog signals can be encoded and compressed into digital signals, also known as "data". The compressed program data can deliver, for example, audio and video programs having a quality suitable for entertainment at rates around 1–2 Megabits per second (Mb/s).

According to the Motion Pictures Expert Group (MPEG) standard, the analog program signals are encoded as a transport stream. During the encoding, spatial and temporal compensation are used to compress the programs. If the program includes video signals, chromatic compression can also be used. Under the MPEG standard, the number of bits which represent a particular timed sequence of the program can vary because of variations in compression efficiency. Equipment at the customer's premises sequentially accesses the transport stream to decode, decompress, and reconstruct the program for replay on an audio-visual device, such as a television or PC.

Since the number bits of the encoded transport stream can very per unit of program time, it is important that the relative "real" time relationship of the encoded signals be maintained. The real time of the program is maintained by using program clock references (PCRs). The PCRs are added to the transport stream during encoding. The PCRs are used during decoding to present the reconstructed program at a rate in accordance with the real time of the original program.

According to the MPEG standard, the PCRs are encoded as forty-two bit values. In order to maintain an accurate real time of the program, the PCRs are added to the encoded transport stream at program time intervals not to exceed 100 milliseconds. Effectively, the PCRs periodically time-stamp the transport stream with the program's real time. Thus, the customer premises equipment can, time-wise, accurately reconstruct the analog program signals for play on audio-visual devices.

Great care must be taken in delivering the transport stream to the customer premises equipment at a rate which remains relatively constant with respect to the program's real time. If the transport stream is delivered too slow, the program falls behind. This would be perceived as a substantial deterioration of the program. If the transport stream is delivered too fast, buffers in the customer premises equipment used to store the transport stream during decoding would overflow, and portions of the program could be lost. The situation where there is gross time-wise displacement of the program is called "wander".

The MPEG standard specifies a system layer wherein the transport stream is partitioned into fixed size "packets". The MPEG standard requires that each transport stream (TS) packet transports exactly 188 bytes, each byte transporting eight bits of the program.

In a modem high-speed communications network suitable for transporting program signals, for example, a broadband integrated services network (BISDN), the digital signals are communicated at a frequency which is synchronized to a network clock. This means that the data are transported at a constant bit rate. The BISDN can include central offices (COs) interconnected by high-speed trunks. Typically, the trunks operate at standard rates, for example, frequencies which are multiples of the basic Synchronous Optical Network (SONET) transport rate defined by the International Consultative Committee for Telephony and Telecommunications (CCITT). For example the SONET STS-12c/OC-12 standard specifies a transport rate of 622 Mb/s.

The BISDN typically employs asynchronous transfer mode (ATM) techniques. The technique is called asynchronous because data are scheduled for transport on a basis of need and availability. In this technique, the signals or "data" are routed through the network over "virtual circuits" in self-contained, fixed-length quantities called "cells". The circuits are virtual because successive network sessions between the same source and destination can use physically different routes.

Therefore, the cells, in addition to transporting "payload" data, also carry control and routing information. The control and routing information cause the ATM switches to direct the cells to their proper destination. Communications standards used with ATM techniques specify that cells will transport exactly 53 bytes. The first five bytes of the cell are dedicated to transporting the control and routing information. The last 48 bytes are available for transporting the payload data. If no data are available for transport over a circuit at any instant in time, an idle cell must be generated to maintain the constant bit rate.

To format 188 byte MPEG TS packets fit into ATM transport cells, it has been proposed that two TS packets, e.g., 376 bytes, be transported as an eight cell ATM adaptation layer five (AAL5) protocol data unit (PDU). The eight cells of the PDU provide 384 payload bytes. The remaining eight bytes of payload capacity are used to transport a common part convergence sub-layer adaptation trailer which is used by the customer premises equipment to reconstruct the TS packets.

A problem arises as a result of formatting the two TS packets into the eight cell PDUs. If a first TS packet of a PDU includes a PCR, then the customer premises equipment can not reassemble the first packet until after the second packet of the PDU has been received. This means that the PCR of the first TS packet is interpreted later than anticipated. This may cause the reconstructed program signals to be locally distorted in time. This localized time distortion is sometimes known as "jitter".

Therefore, is also proposed that a single 188 byte TS packet, plus the eight byte AAL5 wailer, be transported as a five cell PDU. Here, only 196 of the 240 available payload bytes are consumed. This means that 44 bytes, or about a little less than a fifth of the PDU do not transport timed program data.

Constructing and transporting cells which are only partially used consumes server resources and network bandwidth. Transporting five cell PDUs also delays the delivery of a next cell by the amount of time it takes to transport the additional 8×44 (352) bits which were not accounted for during encoding. If the number of five cell PDUs for a particular portion of the program is relatively high, then the reconstructed program wanders in time, if the program is transported using ATM type of networks.

It is desired to transport five and eight cell PDUs in a manner which does not cause distorting jitter and wander in the reconstructed program.

One solution is to analyze the program, prior to transport, and determine exactly the number and location of the PCRs. Then, the relative number of five and eight cell PDUs can be determined in order to allocate a virtual circuit having a bandwidth which closely matches the required transport rate.

A typical MPEG encoded movie program may approximately include 2.4 gigabytes of data. Scanning and analyzing this amount of data consumes time. In an interactive environment, users can initiate the delivery of a large number of different programs in a relatively short time. For example, in a home-shopping session, the user may view catalogs, product demonstrations, and credit information. Pre-scanning all possible programs in real-time would interfere with the interactive delivery of the programs.

An alternative solution would adjust, as the TS packets are formatted into PDUs, the PCRs. However, now the transport stream may no longer be compliant with standard MPEG encoding. Furthermore, this solution, perhaps, makes the transport stream unsuitable for transport protocols, other than ATM, which do not use five and eight cell PDUs.

Therefore, it is desired to provide a method and apparatus which can condition the timed program data independent of transport timing to minimize jitter and wander during program reconstruction. Furthermore, the method and apparatus should operate without wasting system and network resources. In addition, it is desired that the method and apparatus operate on the program signals representing program data as they are being delivered in an interactive environment.

SUMMARY OF THE INVENTION

In an interactive video-on-demand system, real-time programs are encoded as a transport stream including a plurality of transport stream packets. Some of the transport stream packets include timing signals indicating the real time of the program. The transport stream packets are formatted into transport cells for transport over an asynchronous transfer mode network from a source to a destination. The formatted cells include routing information for transporting the transport stream over virtual circuits.

The cells are transported at a transport rate which is determined by a network clock. The transport rate is chosen to deliver the transport stream faster than the real time of the program. While transporting the transport stream, it is determined if the transport stream is being transported ahead of the real time of the program. In this case, idle cells are injected into the transport stream to have the program arrive at the destination in the real time of the program.

A transport controller writes the transport stream to a cell queue at a rate which is synchronized to the encoding rate. While in the cell queue, the transport stream is partially formatted for transport over an asynchronous transfer network as transport cells. The transport stream is read from the cell queue at a transport rate which is synchronized to a network clock. The transport rate is independent of the encoding rate. While reading the transport stream from the cell queue, idle cells are injected into the transport stream if the cell queue is found to be empty.

An alternative process writes the transport stream to a cell buffer at a system rate. The system rate synchronized to a system clock. The transport stream is formatted for transport in the cell buffer. A determination is made if the formatted transport stream will be transported ahead of the encoding rate, based on a ratio transport units having different sizes. If the program is being transported ahead of its encoding rate, idle cells are supplied to the transport stream to have the program arrive at the destination in real time.

DETAILED DESCRIPTION OF PREFERRED EMBODIMENTS

Figure 1:
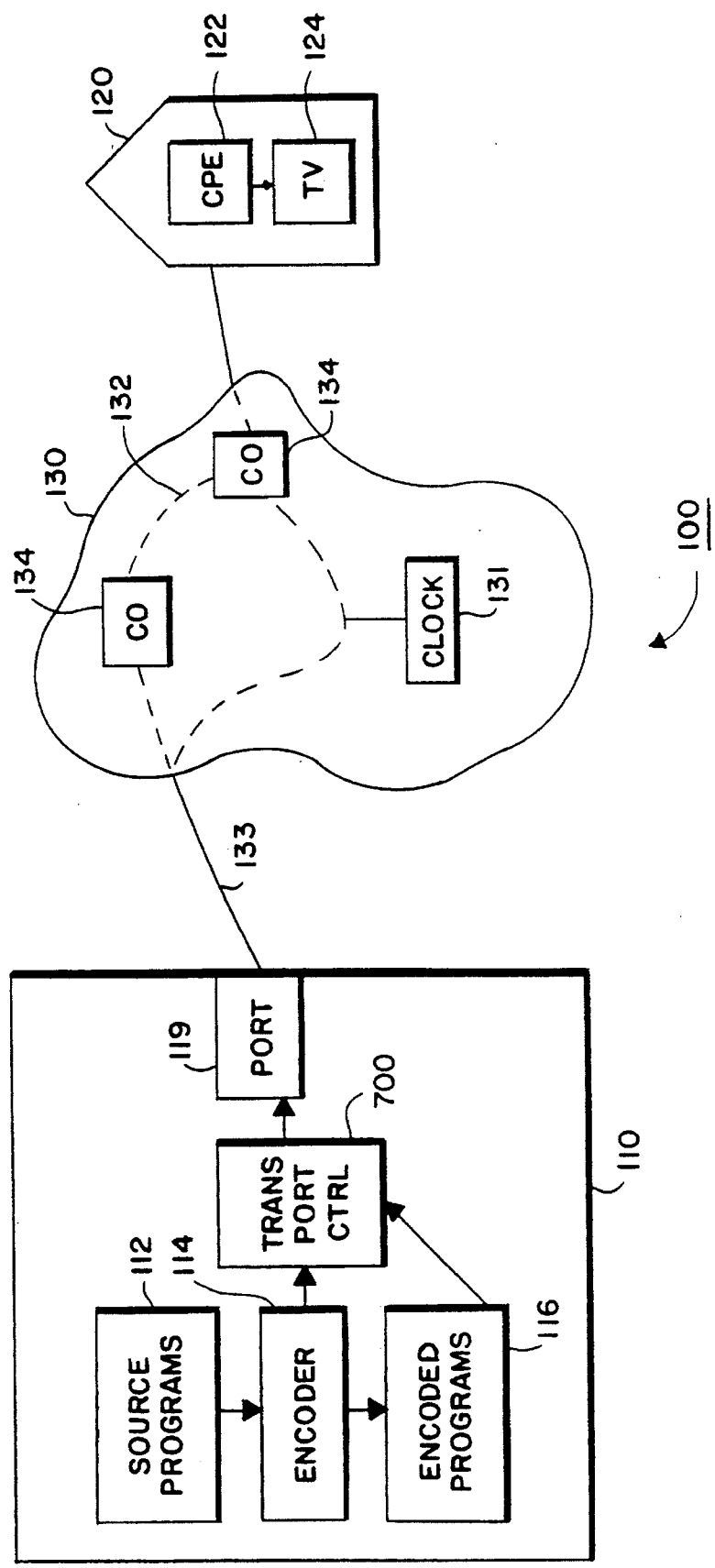
FIG. 1 is a block diagram of a video-on-demand system which can use the invention.

FIG. 1 shows a system 100 for delivering programs from a video server 110 to customer premises 120 via a network 130. Programs can include, for example, video and audio signals.

The server 110 can include a memory 112 for storing source programs. The source programs can be represented by analog signals stored on, for example, magnetic or optical recording media arranged as a "video" juke-box. Low cost bulk media, such as tapes, can be limited to sequential access, and may not be suitable for interactive use. An encoder 114 digitizes the source programs to an encoded and compressed form, e.g. program data. The encoded programs can be stored on random access memories 116, for example, disk drives.

The encoding data can be in accordance with the MPEG standard. For more detailed information related to the MPEG standard, see "MPEG: A Video Compression Standard for Multimedia Applications", Didier LeGall, Communications of the ACM, Vol. 34, No 4, April 1991.

A transport controller 700, described in further detail below, can be used to read the program data from the random access memory 116, and to condition the data for transport on the network 130. Once the data are conditioned, the data are presented to a communications port 119 as a transport stream. The port 119 is connected to the network 130 by a high-speed communications link 133. The link 133 can concurrently carry signals for a large number of programs.

The communications network 130 can be a digital service network, e.g. BISDN, public or private. The network 130 can include one or more central offices (CO) 134. The COs 134 are usually interconnected by high speed trunks operating at multiples of basic Synchronous Optical Network (SONET) constant bit transport rates, for example, 622 Mb/s (STS-12c/OC-12).

The BISDN typically employs asynchronous transfer mode (ATM) techniques. In this technique, the signals or "data" are routed through the network over "virtual circuits" 132. The frequency used for the synchronous rate of transport in the network 130 is controlled by, for example, one or more cesium-based network clocks 131.

At each customer premises 120 there is customer premises equipment (CPE) 122. The CPE 122 can be in the form of a "set-top" box for interfacing with the network 130, and for decoding the received transport stream to reconstruct source programs. The decoded signals can be presented to an audio-visual device, such as a television (TV) 124 using industry standard analog signals. Alternatively, the audio-visual device can be a personal computer (PC).

Figure 2:
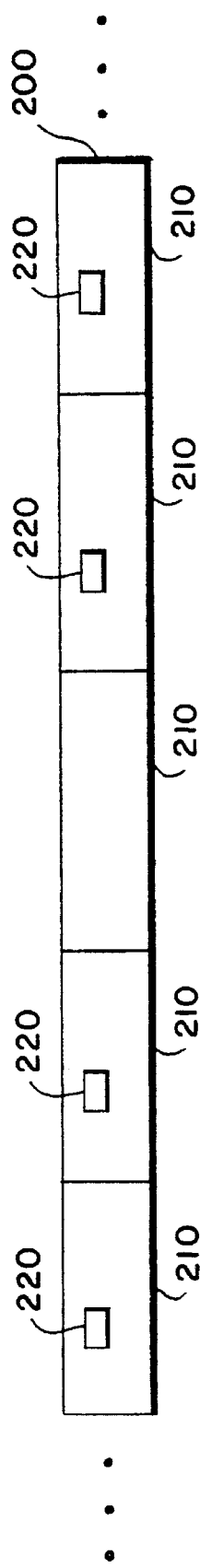
FIG. 2 is a block diagram of a portion of a program transport stream.

Turning now to FIG. 2, there is shown a portion of a transport stream 200 which represents a program after encoding and compressing according to the MPEG standard. The transport stream 200 is organized into a plurality of transport stream (TS) packets 210. Each TS packet 210 includes, for example, 188 bytes. Program timing information is encoded in program clock reference (PCR) fields 220. If one of the TS packets 210 includes a PCR 220, the PCR 220 is transported at a predetermined location with respect to the beginning of the packet 210.

The PCR 220 is a forty-two bit field indicating a relative "real" time of the program. The PCRs 220 are added to the transport stream 200 by the encoder 114 at time intervals of the original source program not to exceed a hundred milliseconds. The PCRs 220 can be used to control the rate at which the TS stream is decoded to reconstruct the program in its original real time.

Figure 3:
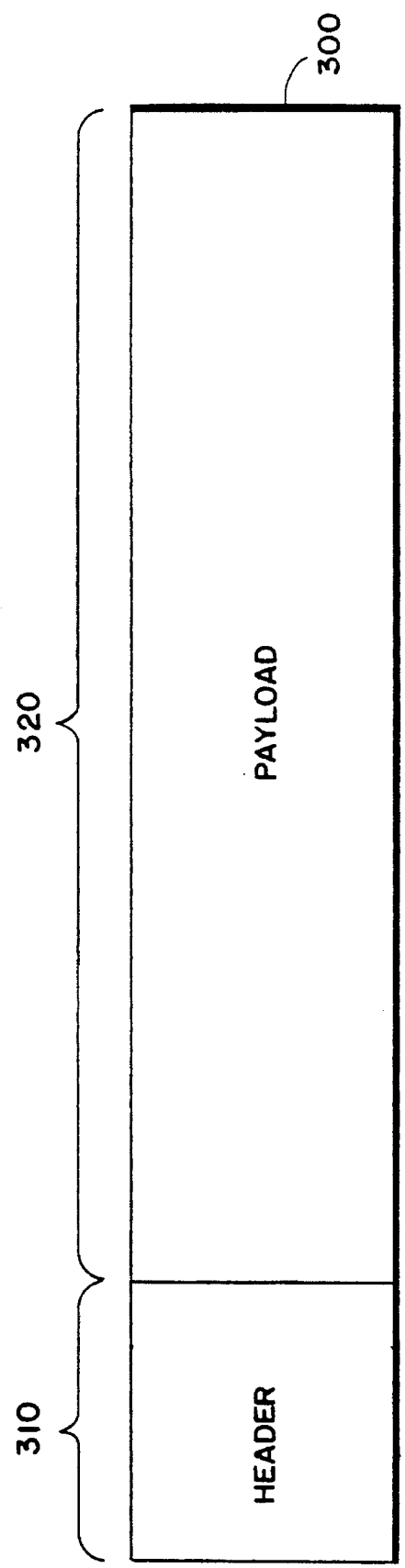
FIG. 3 is a block diagram of an asynchronous transfer mode (ATM) cell used to transport the transport stream of FIG. 2.

FIG. 3 shows an ATM network transport cell 300 which can be used to transport the transport stream 200 of FIG. 2 from the "source" server 110 to the "destination" CPE 122. In the network 130 using ATM, the cell 300 is defined to be exactly 53 bytes. The cell 300 includes a header 310 and a payload 320. The header 310 includes control and routing information.

The problem is to format the data of the TS packets 210 into the cells 300 so that server and network resources are minimized. Furthermore, it is a problem to transport the cells 300 to the CPE 122 with a minimum amount of jitter and wander. For, example, if cells containing PCRs 220 are delivered later or sooner than they should be, the reconstructed program can be substantially distorted.

Figure 4:
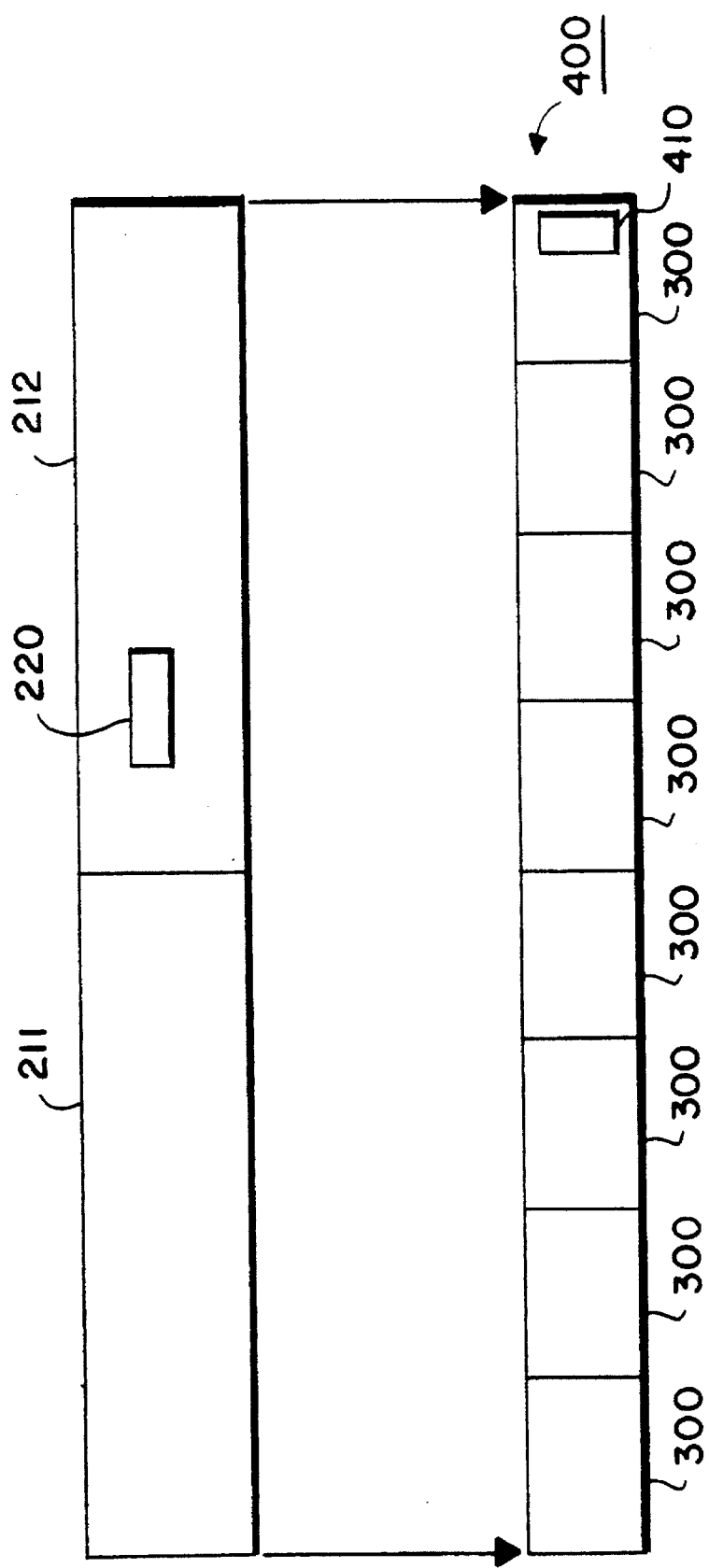
FIG. 4 shows a mapping of two transport stream packets into an eight cell ATM protocol data unit (PDU)

FIG. 4 shows how two MPEG TS packets 211–212 can formatted into a plurality of cells 300 of FIG. 3. Program data of the two 188 byte MPEG TS packets 211–212, e.g. 376 bytes, can be transported as an eight cell protocol data unit (PDU) 400. The payloads 320 of the cells 300 provide for 384 bytes. The remaining eight bytes of the PDU 400 can be used to transport a common part convergence sub-layer adaptation trailer 410. The trailer 410 transports information which can be used by the CPE 122 to decompose the formatted PDU 400 back into the TS packets 210.

As shown in FIG. 4, only the second TS packet 212 transports a PCR 220. In this case, the two TS packets 211–212 can be transported over the network 130 as an eight cell PDU 400. The PCR 220 of the second TS packet 212 will approximately arrive at the CPE 122 at the correct program time. Also, if both TS packets 211–212 do not have PCRs, the two TS packets can be transported as an eight cell PDU 400. In this case, where there no PCRs to transport, PCRs do not need to be decoded.

However, cases may arise where the first TS packet 211 of the eight cell PDU 400 would include a PCR. In such cases, if the first TS packet 211 were to be transported as part of an eight cell PDU, the CPE 122 can not decode the first TS packet 211 until after the second TS packet 212 was received. As a result, the PCR 220 of the first TS packet 211 is not interpreted until a later than anticipated time. This may cause jitter in the reconstructed program.

Figure 5:
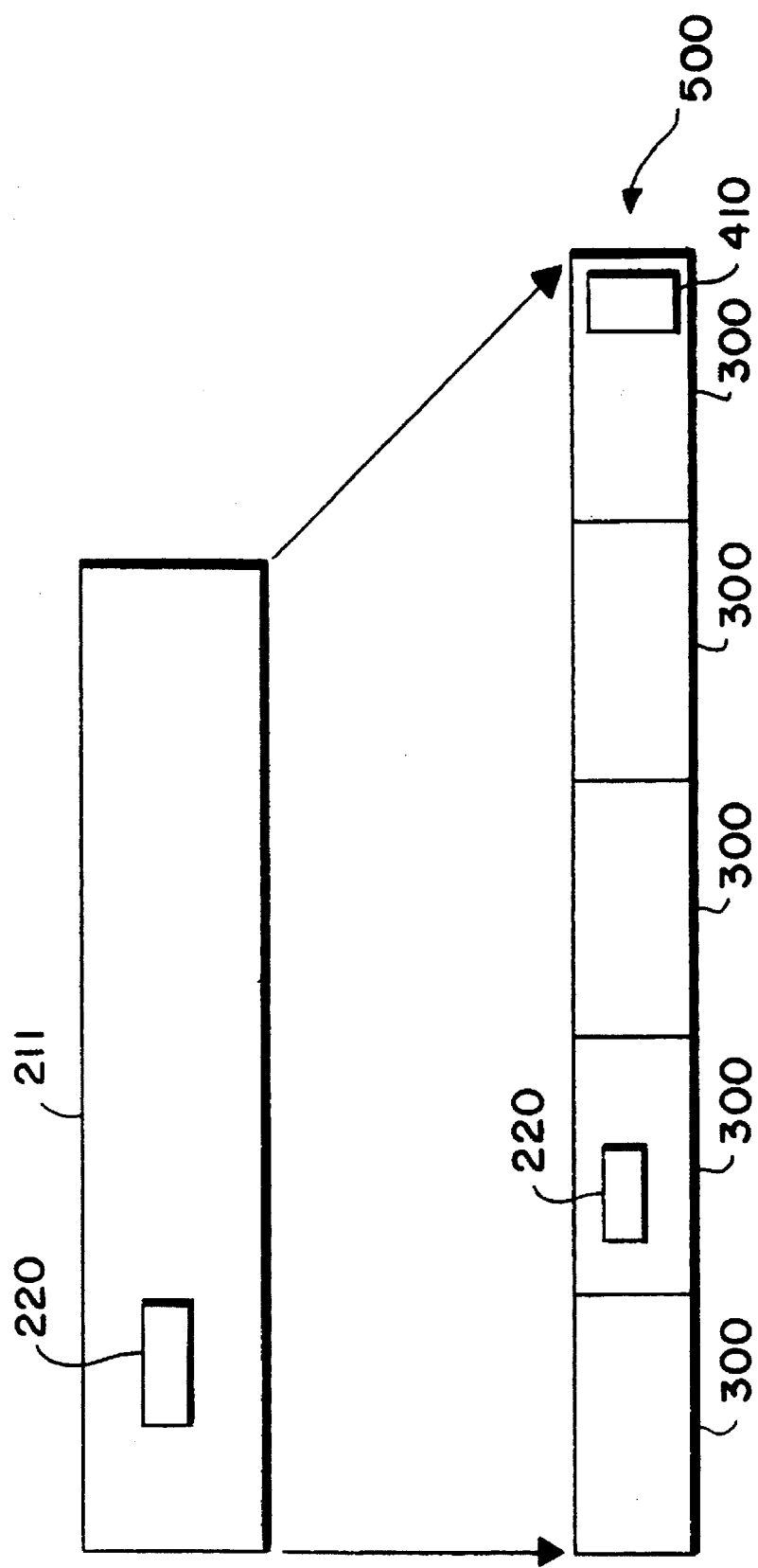
FIG. 5 shows a mapping of one transport packet into a five cell ATM protocol data unit.

FIG. 5 shows an alternative arrangement for formatting TS packets 210 in the case where the first TS packet includes a PCR 220. Here, the 188 byte TS packet 211, and eight byte trailer 410 are transported as a five cell PDU 500 instead. The PDU 500 has 5×48 available payload bytes, e.g. 240 bytes. This means that 44 bytes of the five cell PDU 500 are not used for data of the transport stream 200. These extra bytes consume network bandwidth and, if discounted, can cause the program to be delivered at a slower than intended rate.

For example, the transport stream 200 of 188 byte TS packets 210 were encoded to be transported over a network at a predetermined rate of, for example, 1 Mb/s. However, if the network 130 used to transport the program uses ATM, a random distribution of the PCRs in the packets 210 requires, from time-to-time, that portions of the program be transported as five cell PDUs.

While transporting the five cell PDUs, the available bandwidth, e.g. 1 Mb/s is insufficient to maintain a correct program time. Recall that 8×44, e.g., 352, additional bits per PDU are injected into the transport stream due to TS packet to PDU formatting. This means that these portions of the program will now wander with respect to time.

Even if the entire program can be transported as eight cell PDUs, the program would still slowly fall behind in time since the header 310 of each cell transported consumes at least additional five bytes of circuit bandwidth which was not accounted for during encoding.

In order to handle all cases of PCR distribution in the packets 210, the transport controller 700, according to the invention, conditions the timed program data independent of the transport rate to minimize wander and jitter.

Figure 6:
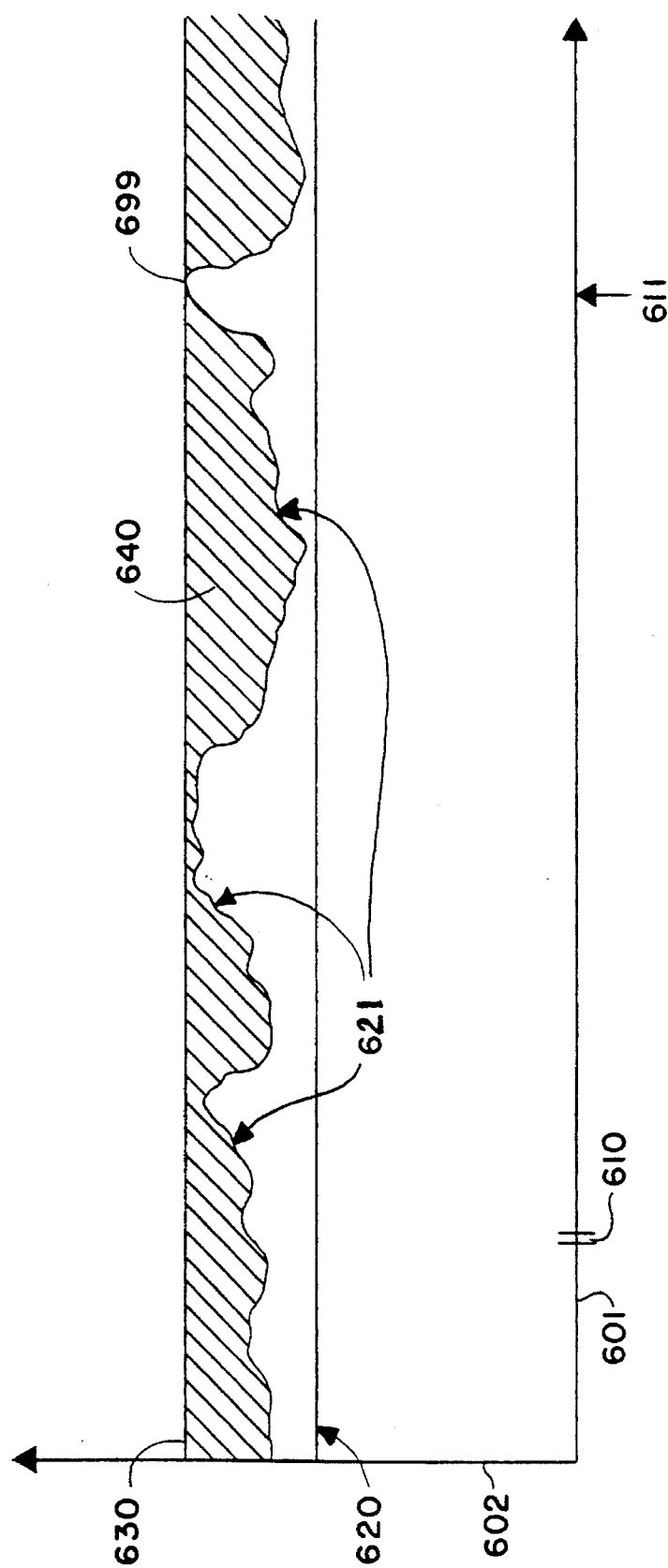
FIG. 6 is a timing diagram showing bandwidth consumption over time while transporting the PDUs of FIGS. 4 and 5.

FIG. 6 shows a solution for conditioning the timed program data. In FIG. 6, the x-axis 601 indicates the relative time during transport of the transport stream 200. The y-axis 602 indicates the relative bandwidth required as a function of time.

The time interval 610 represents, for example, the amount of time required to transport one 53 byte ATM cell 300. A level 620 indicates the bandwidth required to transport the transport stream 200 at the encoding rate. A curve 621 indicates the actual bandwidth required to transport the transport stream over an ATM network. The actual bandwidth, as indicated by the curve 621, varies higher than the encoding rate because of the formatting of the MPEG TS packets into ATM PDUs as explained above. A level 630 is a negotiated transport rate to be used for transporting the formatted transport stream as ATM PDUs.

Recall, an eight cell PDU 400 consumes 424 bytes to transport the bytes of the two TS packets. This is a 1.13 increase in the transport rate over the encoding rate. Five cell PDUs 500 consume 265 bytes of network bandwidth for every 188 bytes of a TS packet. This translates to a 1.41 uplift. Thus, the increase in required transport rate can vary between 13% and 41% depending on the relative proportions of eight and five cell PDUs over time. If the transport stream 200 can be transported entirely as eight cell PDUs 400, the lower transport rate, e.g., 1.13 times the encoding rate would suffice. However, if the transport stream 200 requires nothing but five cell PDUs 500, the transport rate needs to be 1.41 times the encoding rate. In actual practice, the "average" required transport rate will be near 1.13 times the encoding rate, for example 1.2, since a substantial proportion of TS packets will be transported as eight cell PDUs 500.

Therefore, it is required that the negotiated transport rate 630 can handle a peak burst of five cell PDUs without slowing down the delivery of the program at the encoding rate. For example, the program 200 has a peak 699 at time 611. The transport rate required at this time can be used to conservatively set the negotiated bandwidth level 630.

According to the principles of the invention, while transporting portions of the transport stream 200 which consume less than the available transport bandwidth, e.g. the shaded area 640, the virtual transports "idle" cells. The idle or "null" cells ensure that constant bit rate transport is maintained.

Figure 7:
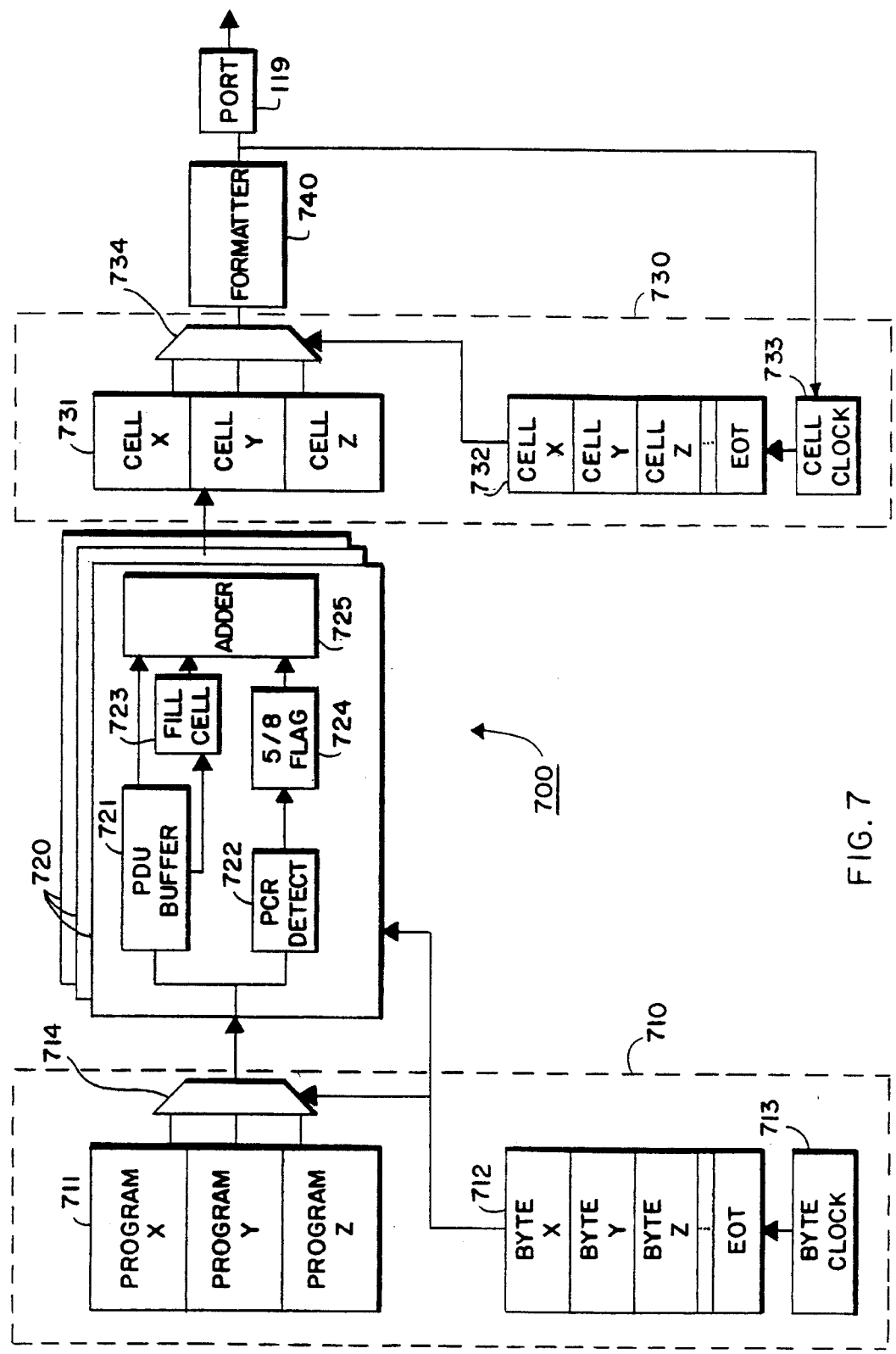
FIG. 7 is a block diagram of a transport controller used to condition the timed program data.

One implementation conditioning the transport stream 200 using a transport controller 700 as shown in FIG. 7. The arrangement shown can be used to concurrently "play" a plurality, e.g., three (X, Y, and Z) programs. The controller 700 includes a byte time division multiplexor (BTDM) 710, payload queues 720, a cell time division multiplexor (CTDM) 730, and a formatter 740.

The BTDM 710 respectively writes the bytes of the program transport streams X, Y, and Z to the payload queues 720. This operation is called "filling" the queues. While in the payload queues 720, the transport streams are monitored and partially formatted depending on detected PCRs.

The CTDM 730 reads the partially formatted transport streams from the payload queues 720. This operation is called "emptying" the queues. The formatter 740 adapts the transport streams for a particular network protocol, e.g. ATM cells 300. This last stage of formatting essentially adds the five byte headers 310 to the payload bytes 320 to produce ATM cells 300. The port 119 connects the formatter 740 to the network 130 of FIG. 1.

The BTDM 710 includes byte buffers 711, a "fill" timing queue 712, a byte clock 713, and a byte multiplexor 714. The buffers 711 can be memory buffers for receiving and storing data of the transport streams X, Y, and Z. The data of the transport streams can be read from the disk memory 116 of FIG. 1. The fill timing queue 712 has at least one entry for each of the programs X, Y, and Z which are being "played" by the server 110. The queue 712 also includes a queue end-of table (EOT).

The order and number of entries of the fill timing queue 712 determines the relative frequency of byte writes or "fills" to the cell queues 720 for the various programs. For example, if the queue 710 has one entry each for programs X, and Y, and three entries for program Z, then, three bytes of program Z will be written to the respective payload queue 720 for every one byte of programs X and Y. This takes care of the situation where programs are encoded to different transport rates. For example, programs X, and Y are encoded for transport at rates of 1 Mb/s, and program Z is encoded for a transport rate of 3 Mb/s.

The frequency of byte fills from the program transport streams into the payload queues 720 is determined by the byte clock 713. That is, for every cycle of the byte clock 713, a byte is selected from one of the program buffers 711, according to the entries of the queue 712 by the byte multiplexor 714. The byte clock 713 is described in further detail below.

As stated above, there is one payload queue 720 allocated to each program which is being "played" by the server 110. The payload queues 720 are context switchable for each of the programs X, Y, Z. Context switchable meaning that separate hardware is maintained and selected for each of the currently "playing" programs X, Y, and Z. Each payload queue 720 for a particular program separately maintains a current "fill" state for its respective program transport stream 200.

Each payload queue 720 includes a protocol data unit (PDU) buffer 721, a PCR detect circuit 722, a fill cell generator 723, a 5/8 cell PDU flag 724, and an adder 725. As bytes are written to the PDU buffer 721 by the BTDM 710, the PCR detect circuit 722 monitors if a current PDU being assembled would not transport a PCR in the first TS packets of an eight cell PDU 400. In this case, the 5/8 cell PDU flag 724 is set to indicate "eight cell PDU" and the two TS packets can be submitted to the CTDM 730 as eight cell PDUs by the adder 725.

However, if a first TS packet of an eight cell PDU would transport a PCR, then the 5/8 cell PDU flag 724 is set to indicate "five cell PDU". In this case, the first TS packet is submitted to the CTDM 730 as a five cell PDU 500 by the adder 725. In this case, the TS next packet is treated as a first TS packet for the next PDU.

The CTDM 730 includes cell buffers 731, an "empty" timing queue 732, a cell clock 733, and a cell multiplexor 734. The buffers 731 can be memory buffers configured to receive TS packet payload data from the adder 725. The empty timing queue 732 has at least one entry for each of the programs X, Y, and Z which are being "played" by the server 110. The queue 732 also includes a queue end-of table (EOT). The entries of the queue 732 are constructed, and operate on the multiplexor 734 essentially as described for the fill timing queue 712 of the BTDM 710. Here, the emptying or reading of the cell buffers 731 into the formatter 740 is controlled by the cell clock 733. The formatter 740 stuffs the payload bytes into the ATM cells 300 with appropriate header for transport via the port 119.

If the any of the cell buffers 731 are found to be empty while reading, the CTDM 730 can signal the corresponding cell queue 720 to provide "fill" cells. The fill cells can be provided by the fill cell generator 723. An idle cell can either be a "null" cell including null bytes, or the idle can be an "available bit rate" (ABR) cell. An ABR cell can be used to transport data other than the transport stream 200, for example, untimed data.

The operation of the clocks 713 and 733 is as follows. For programs transported via virtual circuits of an ATM networks, the bandwidth requested and allocated, e.g., in network terminology "negotiated" transport rate is higher than the encoding rate of the program bit stream. The negotiated transport rate can be at least as great as the peak rate 630. The peak rate 630 can be predetermined by statistical sampling the distribution of PCRs in a random selection of previously encoded programs. As previously state, for ATM transport the transport rate can be somewhere in the range of 1.13 to 1.41 times the encoding rate. The encoding rate is made available to the transport controller when the program is "opened" for access. Opening meaning that the transport stream is identified, and encoding information such as the encoding rate, is made known to the components of the server 110.

For example, if programs are encoded for transport at a rate of 1 Mb/s, the sampled peak transport rate can be determined to be 1.2 Mb/s, e.g. most of the cells are transported as eighth cell PDUs, but some portions of the program require bursts of five cell PDUs. The server 110 can subsequently adjust the negotiated transport rate, up or down, if required. "Renegotiating" the bandwidth may require a tear down of the current virtual circuit, and the establishment of a new circuit at the desired transport rate.

The negotiated transport rate, e.g. 1.2 Mb/s is observable at the port 119 as conventional isochronous embedded clock signals generated by the network clock 131. The network clock signals can be used to derive the clock signals of the cell clock 733. The byte clock 713 runs at a rate which is synchronized to the actual rate at which the programs were encoded. This information is made available to the transport controller 700 when the file of the disk 116 storing the data of transport stream is opened.

Thus, the payload queues 720 are filled by the BTDM 710 at the program encoding rate. The payload queues 720 are emptied by the CTDM 730 at the transport rate. While the transport stream 200 transports less than the "peak" number of five cell PDUs 500, fill cells can be supplied as needed to maintain cell synchronization. Idle cells which are null cells which are received by the CPE 122 can be ignored during decoding. With the transport controller 700 as described herein, program wander is minimized, and packet-to-packet jitter can be eliminated.

Figure 8:
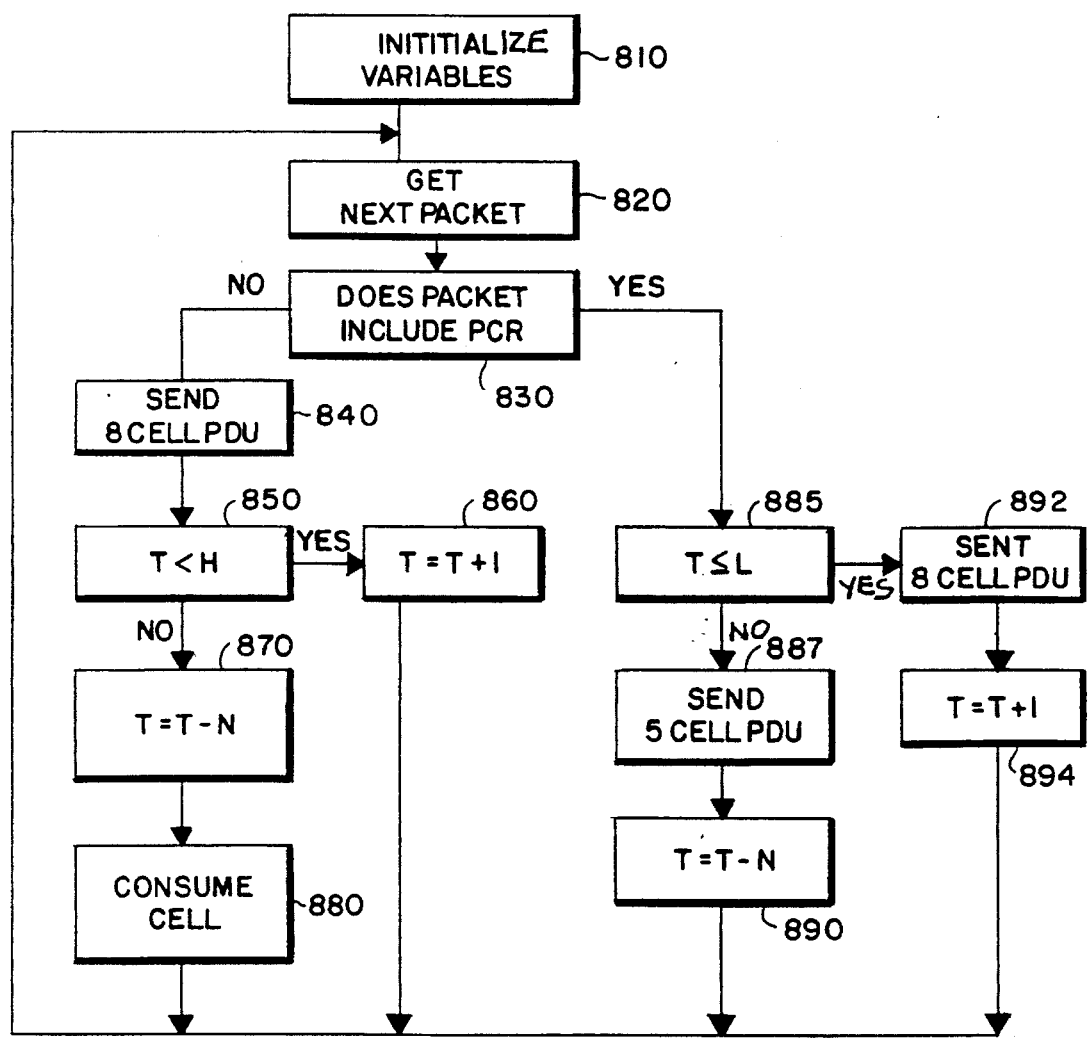
FIG. 8 is a flow diagram of a method to condition the timed program data.

FIG. 8 shows a process which can be used to condition the transport stream. In the process, a transport controller injects idle cells into the transport stream at a rate which depends on a running tally of the ratio of five and eight cell PDUs. If the ratio exceeds a high-threshold, idle cells are inserted into the transport stream. The effect of inserting the idle cells is that the transport of the program 200 is slowed down because available bandwidth of the circuit is consumed.

If the ratio of five and eight cell PDUs drops below a low-threshold, the controller stops sending five cell PDUs until the program "catches up". In effect, this process provides hysteresis to "smooth" out the peaks of the curve 621 where the transport stream, after formatting, requires a greater portion of the available network bandwidth.

FIG. 8 shows a process 800 of a transport controller using a single transport schedule. The process 800 operates by sending "compensating" PDUs as required. A compensating PDU can either be an five cell PDU, or an eight cell PDU followed by an idle cell, e.g. the later PDU effectively transports nine ATM cells 300.

The process 800 uses one variable and three parameters which can be integers, or real numbers:

T Tally represents the number of uncompensated eight cell PDUs which have been transported.

N ⅝ ration is the expected number of eight cell PDUs for every five cell PDU;

H high-threshold is the maximum allowed value of T; and

L low-threshold is the minimum allowed value for T.

The variable tally (T) is maintained for each virtual circuit which is actively transporting programs. The other parameters can also be maintained on a per circuit basis, or for a group of circuits and transport streams that have the same encoding and transport characteristics.

In step 810, the variable T is initialized and the parameters N, L, and H are acquired. In step 820, the next MPEG TS packet 210 is read into a cell buffer. The TS packets are read at a rate which is synchronized to a system clock of the server 110. For example, the bytes of the packets are transferred from the memory 116 to the cell buffer at 100 Megabytes per second. In other words, the transfer rate is orders of magnitude larger than the encoding rate.

In step 830, determine if the current TS packet will transport a PCR 220. If the packet will not transport a PCR, send the current and next TS packet as an eight cell PDU in step 840. Then, determine if the tally is less than the high-threshold in step 850. If it is, increment tally in step 860, and continue with step 820.

Other wise, if tally exceeds the high-threshold, then decrease tally by N, in step 870. In this case, "stall" the program for one cell time by sending a compensating idle cell in step 880. Continue with step 820.

If in step 830, it is determined that the current TS packet will transport a PCR, determine if the tally is less than, or equal to the low-threshold in step 885. If the answer is no, in step 887, send the TS packet as a five cell PDU, and decrease tally by N in step 890. Otherwise, send the current packet and the next packet as an eight cell PDU in step 892, increment tally in step 894, and continue with step 820. The later step may introduce some jitter into the reconstructed program in order to maintain "forward" wander. Transporting the program too fast may cause CPE 122 buffers to overflow, possibly distorting the program.

While specific implementations of the invention have been described with respect to an interactive video-on-demand system, those familiar with the art will appreciate that the invention may be practiced for other types of timed program data transported over networks using protocols other than asynchronous transfer mode while still remaining within the scope and spirit of the appended claims.

We claim:

1. A method for transporting program data having a real time from a source over a network to a destination, comprising:

formatting the program data as a transport stream;

transporting the program data at a transport rate as part of said transport stream, said transport rate determined by a network clock, and said transport rate chosen to have said transport stream of data transported faster than the real time;

monitoring the program data while transporting to determine if the program data is ahead of the real time; and injecting, in response to the said monitoring, null data into said transport stream of data to have the program data arrive at the destination in real time.

2. The method of claim 1 further comprising:

partitioning the program data into a plurality of transport stream packets;

writing the transport stream packets to a cell queue at an encoding rate of the program data;

organizing said plurality of transport stream packets into transport cells, each transport cell including routing information;

reading said transport cells from said cell queue at the transport rate; and supplying idle cells if said cell queue is empty.

3. The method as in claim 1, further comprising:

writing the program data to a cell buffer at a rate determined by a system clock, said system clock being independent of said network clock;

formatting the program data in said cell buffer into said transport stream;

determining, while transporting said transport stream of data, if said program data is being transported ahead of the real time; and supplying, in response to said determining, said idle data for said transport stream to have said program data arrive at the destination in the real time.

* * * * *